(12) United States Patent
Murakawa

(10) Patent No.: US 12,710,862 B2
(45) Date of Patent: Aug. 18, 2026

(54) SYSTEM, PRODUCT MANUFACTURING METHOD, INFORMATION PROCESSING APPARATUS, INFORMATION PROCESSING METHOD, AND RECORDING MEDIUM

(71) Applicant: CANON KABUSHIKI KAISHA, Tokyo (JP)

(72) Inventor: Keisuke Murakawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 300 days.

(21) Appl. No.: 18/221,456

(22) Filed: Jul. 13, 2023

(65) Prior Publication Data

US 2024/0028188 A1 Jan. 25, 2024

(30) Foreign Application Priority Data

Jul. 22, 2022 (JP) ................................ 2022-116822

(51) Int. Cl.
*G06F 3/04847* (2022.01)
*G05B 19/4155* (2006.01)
(Continued)

(52) U.S. Cl.
CPC ... *G06F 3/04847* (2013.01); *G05B 19/41865* (2013.01); *G06F 3/0482* (2013.01); *G06F 3/0486* (2013.01); *G06F 2203/04803* (2013.01)

(58) Field of Classification Search
CPC .. G06F 3/04847; G06F 3/0482; G06F 3/0486; G06F 2203/04803; G06F 3/04845;
(Continued)

(56) References Cited

U.S. PATENT DOCUMENTS

2017/0374360 A1* 12/2017 Kranski ................. H04N 23/90
2018/0104819 A1* 4/2018 Zyda ...................... B25J 9/1658
(Continued)

FOREIGN PATENT DOCUMENTS

JP H07-084768 A 3/1995
JP 2005-327263 A 11/2005
(Continued)

OTHER PUBLICATIONS

Tezuka (JPH0784768A, published Mar. 31, 1995, pp. 1-7) (Year: 1995).*

(Continued)

*Primary Examiner* — Stephen S Hong
*Assistant Examiner* — Ahamed I Nazar
(74) *Attorney, Agent, or Firm* — Venable LLP

(57) ABSTRACT

A system includes a first processing portion configured to perform processing on a basis of a first command, a second processing portion configured to perform processing on a basis of a second command conforming to different specifications than the first command, and an information processing portion configured to display a user interface image configured to receive selection of a first module and a second module, obtain the first command on a basis of the first module in a case of receiving the selection of the first module, and obtain the second command on a basis of the second module in a case of receiving the selection of the second module.

24 Claims, 10 Drawing Sheets

(51) Int. Cl.

| | |
|---|---|
| ***G05B 19/418*** | (2006.01) |
| ***G06F 3/0482*** | (2013.01) |
| ***G06F 3/04845*** | (2022.01) |
| ***G06F 3/0486*** | (2013.01) |

(58) Field of Classification Search

CPC ... G06F 8/34; G05B 19/41865; G05B 19/409; G05B 2219/33053; G05B 2219/35565; G05B 2219/36231; G05B 19/4155; B25J 9/1656

USPC .......................................................... 715/769

See application file for complete search history.

(56) References Cited

U.S. PATENT DOCUMENTS

| | | | | |
|---|---|---|---|---|
| 2019/0229639 | A1* | 7/2019 | Ueda | G06F 8/34 |
| 2020/0290204 | A1* | 9/2020 | Hirabayashi | B25J 13/089 |
| 2022/0413810 | A1 | 12/2022 | Nagata et al. | |
| 2023/0011461 | A1* | 1/2023 | Antony | G06F 8/71 |
| 2023/0132698 | A1* | 5/2023 | Escudero | H04L 47/43 709/226 |
| 2025/0334946 | A1* | 10/2025 | Thon | G05B 19/0428 |

FOREIGN PATENT DOCUMENTS

| | | |
|---|---|---|
| JP | 2013-140572 A | 7/2013 |
| JP | 2019-128930 A | 8/2018 |
| JP | 2021-105952 A | 7/2021 |

OTHER PUBLICATIONS

JPH0784768A, published Mar. 31, 1995, by Nissan Motor Co Ltd (Year: 1995).*

Feb. 17, 2026 Office Action in Japanese Patent Application No. 2022-116882 (with English translation).

* cited by examiner

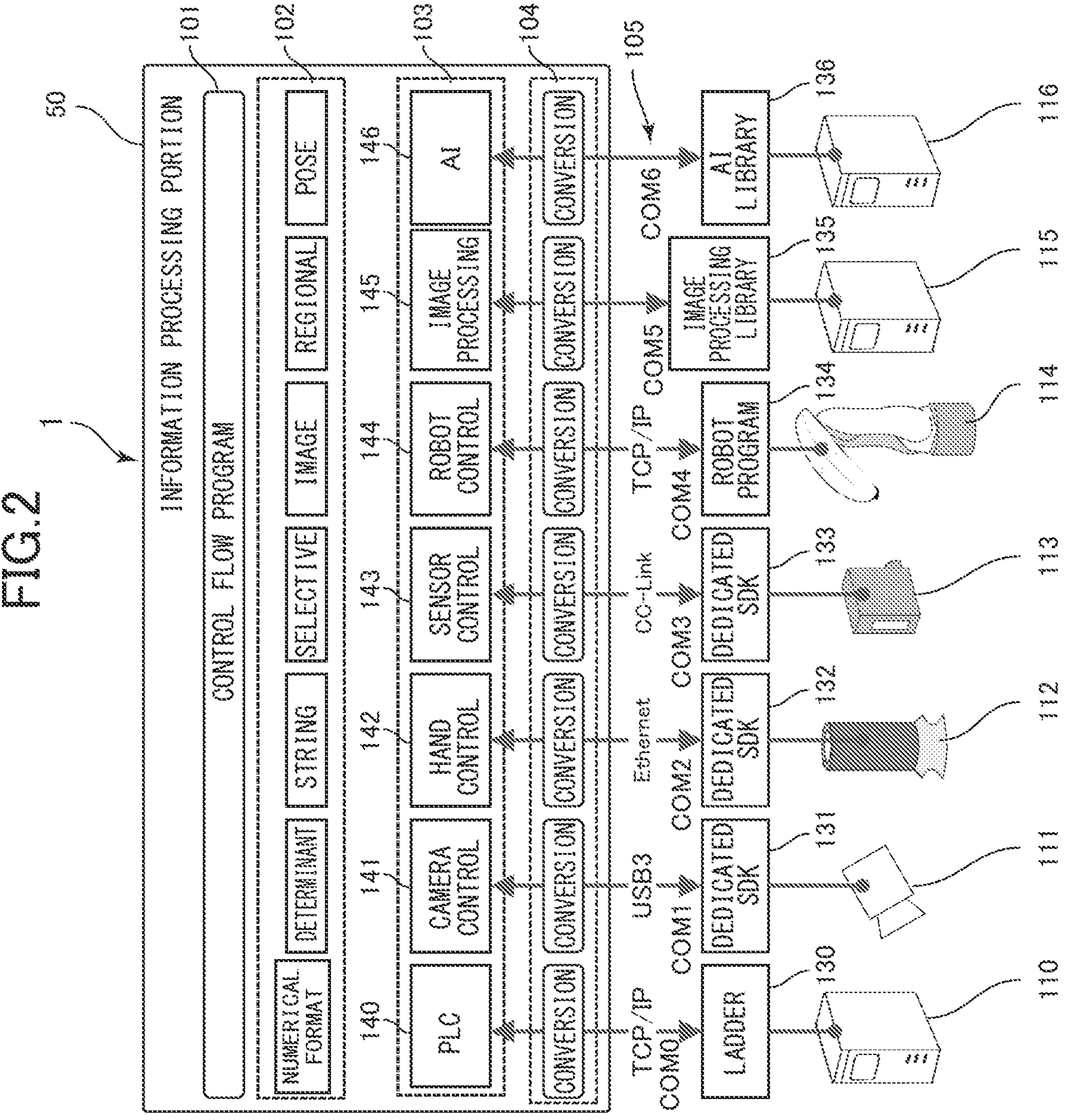
FIG.2
1
50
INFORMATION PROCESSING PORTION
101
CONTROL FLOW PROGRAM
102
NUMERICAL FORMAT
DETERMINANT
STRING
SELECTIVE
IMAGE
REGIONAL
POSE
103
140
PLC
141
CAMERA CONTROL
142
HAND CONTROL
143
SENSOR CONTROL
144
ROBOT CONTROL
145
IMAGE PROCESSING
146
AI
104
CONVERSION
105
TCP/IP
COM0
USB3
COM1
Ethernet
COM2
CC-Link
COM3
TCP/IP
COM4
COM5
COM6
130
LADDER
131
DEDICATED SDK
132
DEDICATED SDK
133
DEDICATED SDK
134
ROBOT PROGRAM
135
IMAGE PROCESSING LIBRARY
136
AI LIBRARY
110
111
112
113
114
115
116

FIG.3

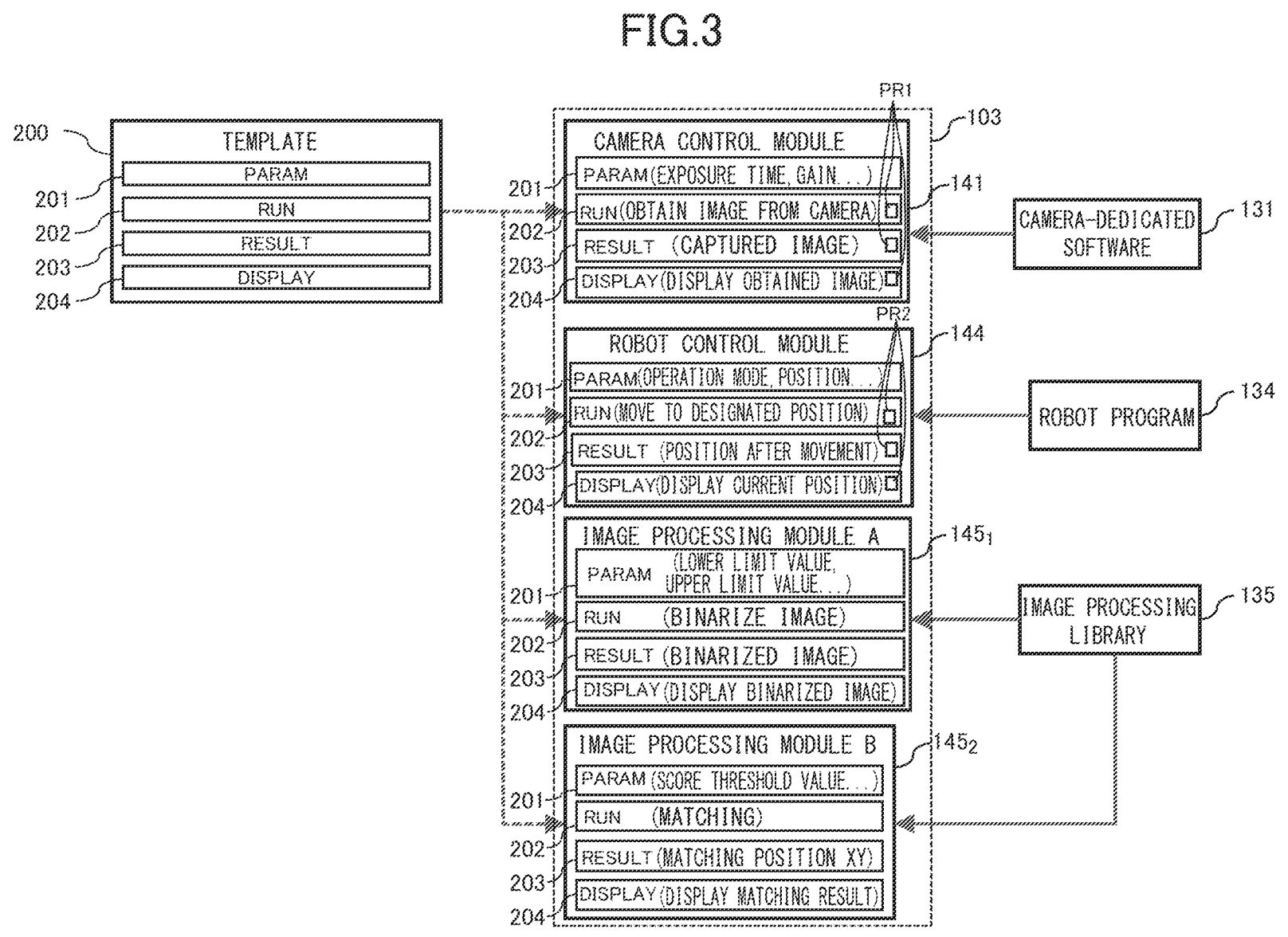

CAMERA-DEDICATED SOFTWARE
131
ROBOT PROGRAM
134
IMAGE PROCESSING LIBRARY
135
103
141
PR1
CAMERA CONTROL MODULE
PARAM(EXPOSURE TIME, GAIN...)
RUN(OBTAIN IMAGE FROM CAMERA)
RESULT (CAPTURED IMAGE)
DISPLAY(DISPLAY OBTAINED IMAGE)
144
PR2
ROBOT CONTROL MODULE
PARAM(OPERATION MODE, POSITION...)
RUN(MOVE TO DESIGNATED POSITION)
RESULT (POSITION AFTER MOVEMENT)
DISPLAY(DISPLAY CURRENT POSITION)
$145_1$
IMAGE PROCESSING MODULE A
PARAM (LOWER LIMIT VALUE, UPPER LIMIT VALUE...)
RUN (BINARIZE IMAGE)
RESULT (BINARIZED IMAGE)
DISPLAY(DISPLAY BINARIZED IMAGE)
$145_2$
IMAGE PROCESSING MODULE B
PARAM(SCORE THRESHOLD VALUE...)
RUN (MATCHING)
RESULT(MATCHING POSITION XY)
DISPLAY(DISPLAY MATCHING RESULT)
201
202
203
204
TEMPLATE
PARAM
RUN
RESULT
DISPLAY
200
201
202
203
204

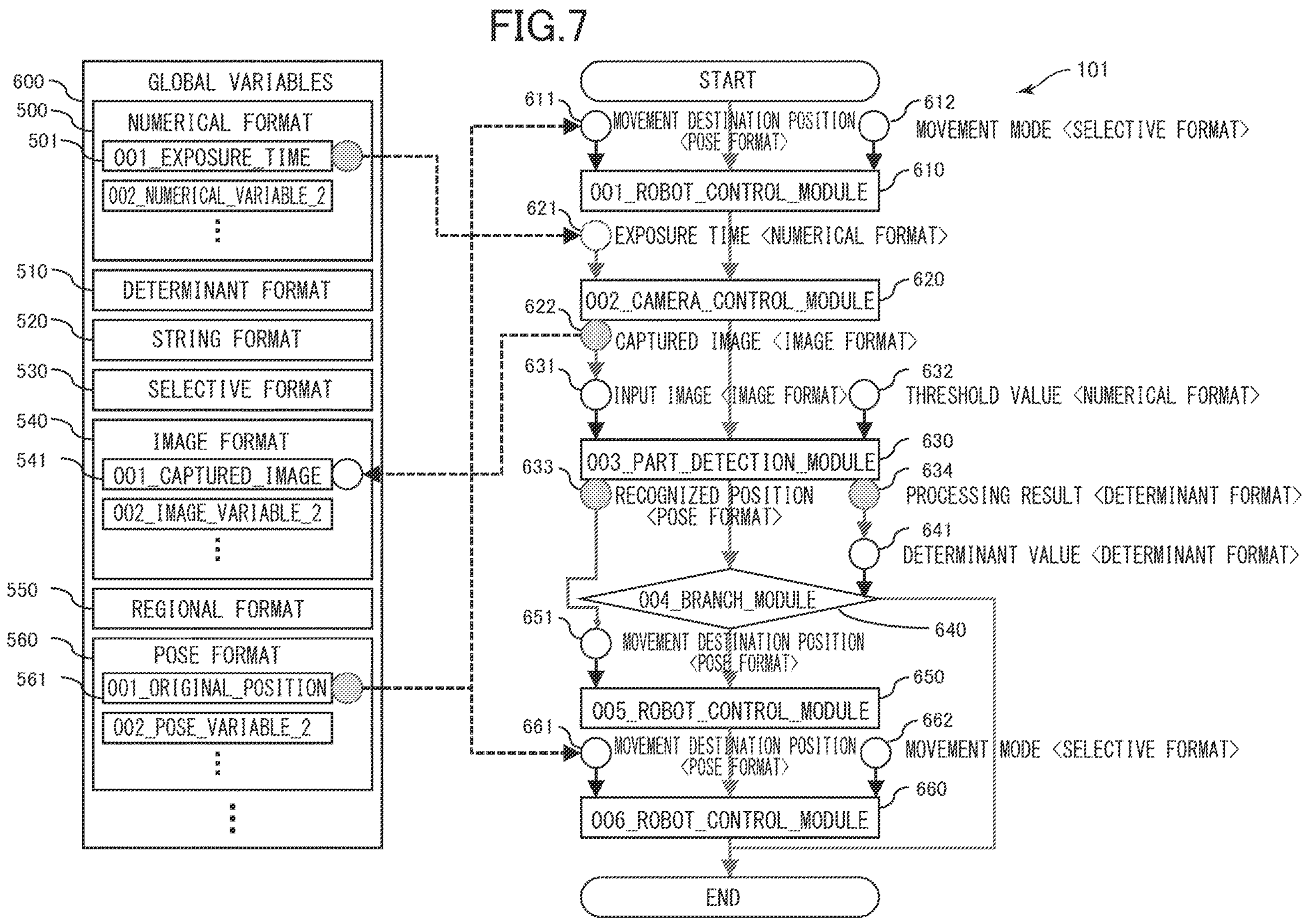
FIG.7
101
600
GLOBAL VARIABLES
500
NUMERICAL FORMAT
501
001_EXPOSURE_TIME
002_NUMERICAL_VARIABLE_2
510
DETERMINANT FORMAT
520
STRING FORMAT
530
SELECTIVE FORMAT
540
IMAGE FORMAT
541
001_CAPTURED_IMAGE
002_IMAGE_VARIABLE_2
550
REGIONAL FORMAT
560
POSE FORMAT
561
001_ORIGINAL_POSITION
002_POSE_VARIABLE_2
START
611
MOVEMENT DESTINATION POSITION <POSE FORMAT>
612
MOVEMENT MODE <SELECTIVE FORMAT>
610
001_ROBOT_CONTROL_MODULE
621
EXPOSURE TIME <NUMERICAL FORMAT>
620
002_CAMERA_CONTROL_MODULE
622
CAPTURED IMAGE <IMAGE FORMAT>
631
INPUT IMAGE <IMAGE FORMAT>
632
THRESHOLD VALUE <NUMERICAL FORMAT>
630
003_PART_DETECTION_MODULE
633
RECOGNIZED POSITION <POSE FORMAT>
634
PROCESSING RESULT <DETERMINANT FORMAT>
641
DETERMINANT VALUE <DETERMINANT FORMAT>
004_BRANCH_MODULE
640
651
MOVEMENT DESTINATION POSITION <POSE FORMAT>
650
005_ROBOT_CONTROL_MODULE
661
MOVEMENT DESTINATION POSITION <POSE FORMAT>
662
MOVEMENT MODE <SELECTIVE FORMAT>
660
006_ROBOT_CONTROL_MODULE
END

Figure 10:
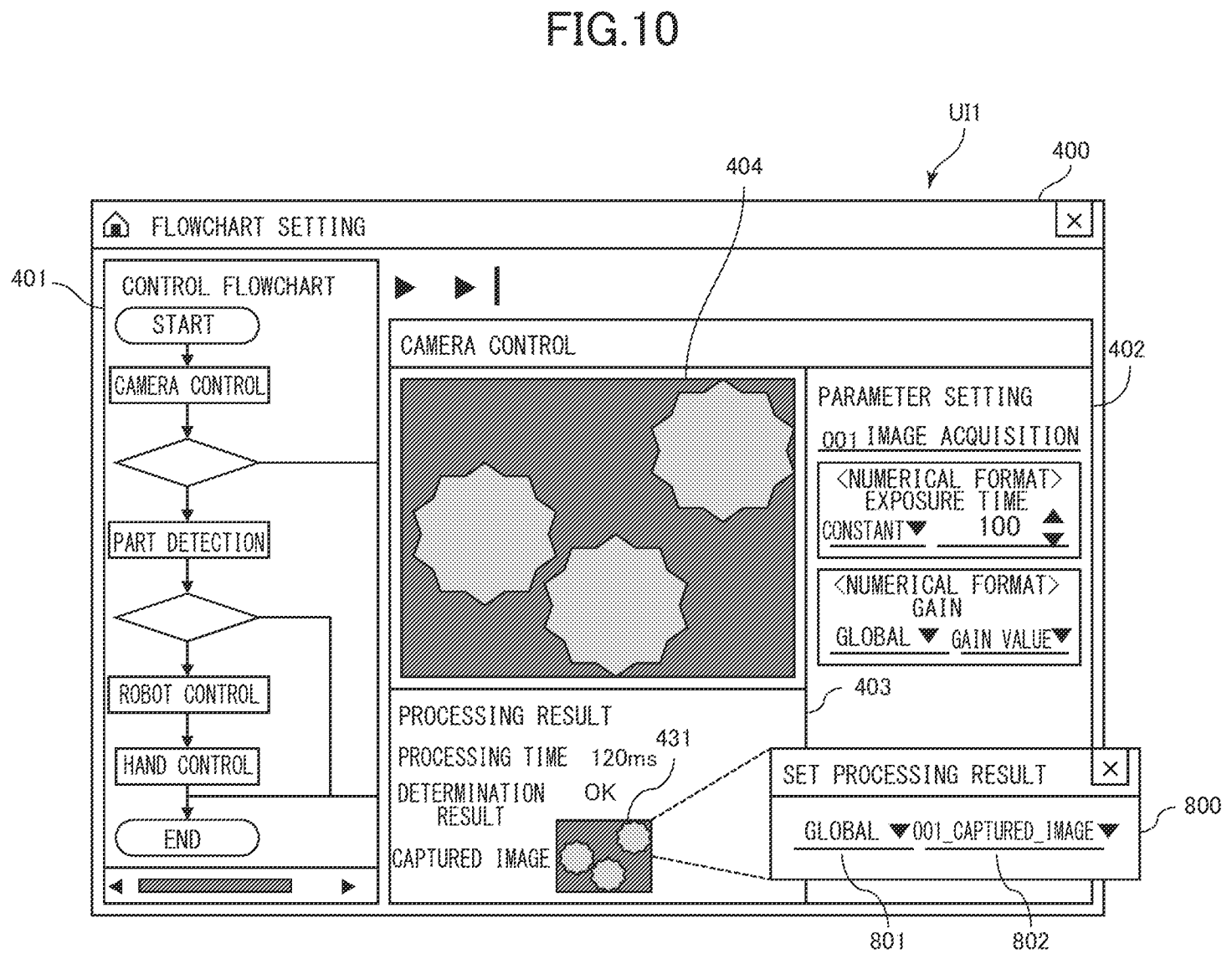

FLOWCHART SETTING
CONTROL FLOWCHART
START
CAMERA CONTROL
PART DETECTION
ROBOT CONTROL
HAND CONTROL
END

CAMERA CONTROL
PARAMETER SETTING
001_IMAGE ACQUISITION
<NUMERICAL FORMAT>
EXPOSURE TIME
CONSTANT 100
<NUMERICAL FORMAT>
GAIN
GLOBAL GAIN_VALUE

PROCESSING RESULT
PROCESSING TIME 120ms
DETERMINATION RESULT OK
CAPTURED IMAGE

SET PROCESSING RESULT
GLOBAL 001_CAPTURED_IMAGE

SYSTEM, PRODUCT MANUFACTURING METHOD, INFORMATION PROCESSING APPARATUS, INFORMATION PROCESSING METHOD, AND RECORDING MEDIUM

BACKGROUND OF THE INVENTION

Field of the Invention

The present disclosure relates to a technique for information processing.

Description of the Related Art

To realize factory automation: FA, a system needs to be constituted by a plurality of FA devices such as a robot, a camera, an image processing apparatus, and a sensor device. In such a system, the data communication standard, the programming language, or the like can be different for each FA device. In addition, a terminal to which the FA device is connected can be different for each FA device. Therefore, the user such as the developer needs to learn a different programming language for each device in order to operate the system.

Meanwhile, Japanese Patent Laid-Open No. H07-84768 discloses that the entire system can be unitarily operated by a single operation terminal by integrating different programming languages that are different between control apparatuses that control the FA devices.

SUMMARY OF THE INVENTION

According to a first aspect of the present disclosure, a system includes a first processing portion configured to perform processing on a basis of a first command, a second processing portion configured to perform processing on a basis of a second command conforming to different specifications than the first command, and an information processing portion configured to display a user interface image configured to receive selection of a first module and a second module, obtain the first command on a basis of the first module in a case of receiving the selection of the first module, and obtain the second command on a basis of the second module in a case of receiving the selection of the second module.

According to a second aspect of the present disclosure, an information processing apparatus includes an information processing portion. The information processing portion is configured to display a user interface image configured to receive selection of a first module and a second module. The information processing portion is configured to obtain, on a basis of the first module and in a case of receiving the selection of the first module, a first command to be executed by a first processing portion. The information processing portion is configured to obtain, on a basis of the second module and in a case of receiving the selection of the second module, a second command that is to be executed by a second processing portion and that conforms to different specifications than the first command.

According to a third aspect of the present disclosure, an information processing method includes displaying a user interface image configured to receive selection of a first module and a second module, obtaining, on a basis of the first module and in a case of receiving the selection of the first module, a first command to be executed by a first processing portion, and obtaining, on a basis of the second module and in a case of receiving the selection of the second module, a second command that is to be executed by a second processing portion and that conforms to different specifications than the first command.

Further features of the present invention will become apparent from the following description of exemplary embodiments with reference to the attached drawings.

BRIEF DESCRIPTION OF THE DRAWINGS

FIG. 2 is a control block diagram of the robot system according to the embodiment.

FIG. 3 is a schematic diagram for describing a module generation method according to the embodiment.

FIG. 7 is an explanatory diagram illustrating an example of a control flow program according to the embodiment.

FIG. 10 is a schematic diagram illustrating an example of a user interface according to the embodiment.

DESCRIPTION OF THE EMBODIMENTS

Even for the method disclosed in Japanese Patent Laid-Open No. H07-84768, the user needs to learn a programming language such as a ladder program for programming of the system, and there has been a demand for further convenience.

An object of the present disclosure is to improve the convenience of programming.

Figure 1:
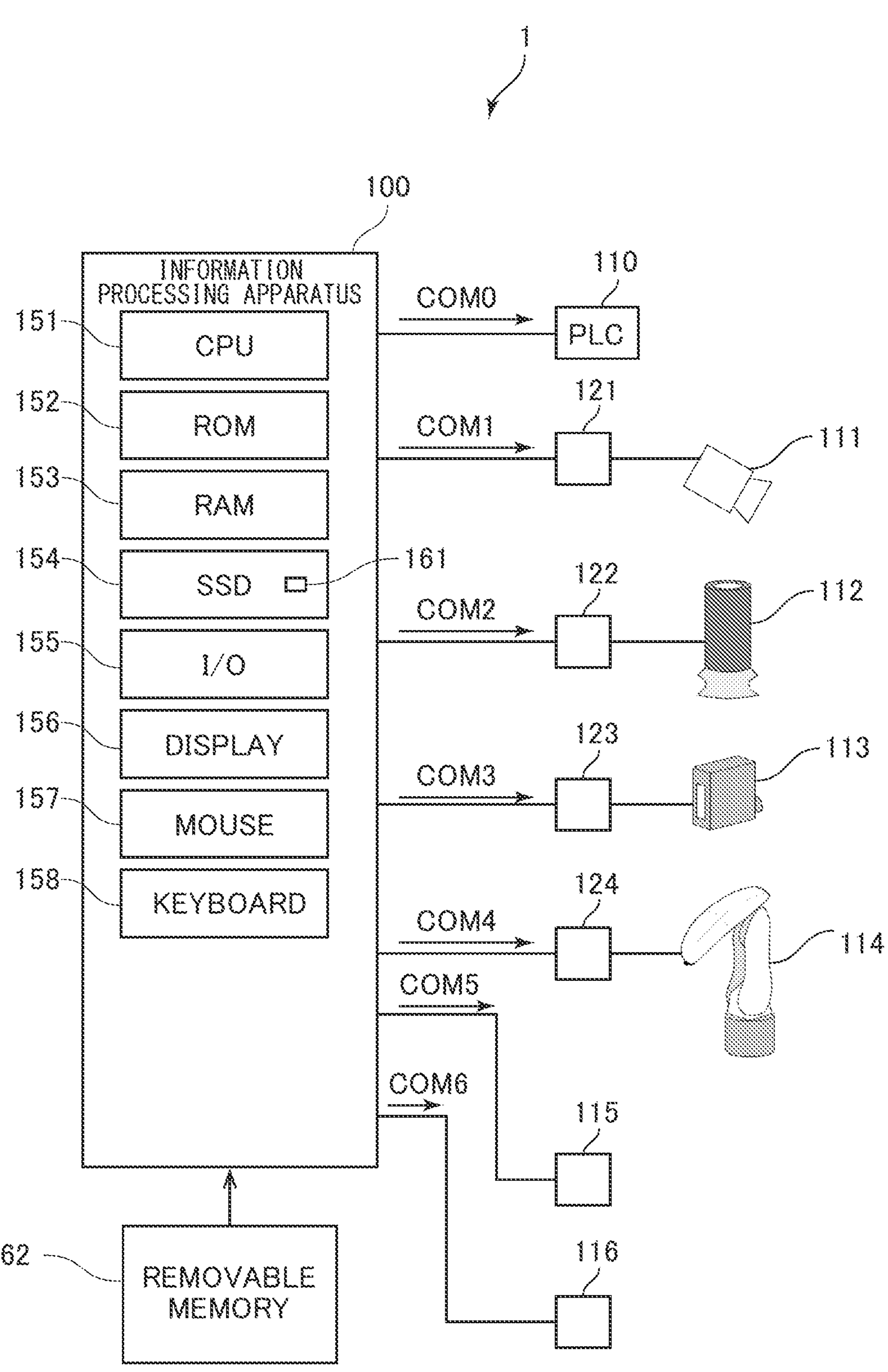
FIG. 1 is a schematic diagram illustrating a robot system serving as an example of a system according to an embodiment.

An exemplary embodiment of the present disclosure will be described in detail below with reference to drawings. FIG. 1 is a schematic diagram illustrating a robot system 1 serving as an example of a system according to the embodiment. The robot system 1 includes an information processing apparatus 100, and a plurality of FA devices used for automated manufacture. The robot system 1 is used for manufacturing a product.

For example, the robot system 1 includes, as the FA devices, a programmable logic controller: PLC 110, a camera 111, a suction hand 112, a sensor device 113, a robot 114, an image processing apparatus 115, an artificial intelligence apparatus: AI apparatus 116, and controllers 121 to 124.

The robot 114 is, for example, an industrial robot arm. The suction hand 112 is an example of an end effector, and is attached to the robot 114. The suction hand 112 is configured to hold a workpiece. The sensor device 113 is included in the suction hand 112. The camera 111 is an example of an image pickup apparatus, and is used for imaging a workpiece such as a part.

The PLC 110 controls, for example, execution timings of apparatuses for causing a camera controller 121, a hand controller 122, a sensor controller 123, a robot controller 124, the image processing apparatus 115, and the AI apparatus 116 to cooperate.

The camera controller 121 is a controller that controls the camera 111. The hand controller 122 is a controller that controls the suction hand 112. The sensor controller 123 is a controller that controls the sensor device 113. The robot controller 124 is a controller that controls the robot 114. The image processing apparatus 115 and the AI apparatus 116 are each constituted by a computer.

The PLC 110, the camera controller 121, the hand controller 122, the sensor controller 123, the robot controller 124, the image processing apparatus 115, and the AI apparatus 116 are connected to the information processing apparatus 100 by a connection method conforming to a predetermined standard.

For example, control for picking up a part serving as a workpiece by the robot 114 when manufacturing a product in the robot system 1 configured as described above will be described. The camera controller 121 causes the camera 111 to capture an image of the part serving as a workpiece, and outputs the captured image to the image processing apparatus 115. The image processing apparatus 115 obtains position information of the part from the captured image. The robot controller 124 obtains the position information of the part from the image processing apparatus 115, and moves the robot 114 to the position of the part. The hand controller 122 operates the suction hand 112 to cause the suction hand 112 to hold the part. At this time, the sensor controller 123 determines, on the basis of a sensing result of the sensor device 113, whether or not the suction hand 112 is holding the part.

The information processing apparatus 100 is constituted by a computer. The information processing apparatus 100 includes a central processing unit: CPU 151 serving as an example of a processor. The CPU 151 functions as an information processing portion by executing a program 161. In addition, the information processing apparatus 100 includes a read-only memory: ROM 152, a random access memory 153, and a solid state drive: SSD 154. In addition, the information processing apparatus 100 includes an I/O 155 that is an input/output interface. In addition, the information processing apparatus 100 includes a display 156 serving as an example of a display portion, and a keyboard 158 and a mouse 157 serving as examples of an input portion. The CPU 151, the ROM 152, the RAM 153, the SSD 154, the I/O 155, the display 156, the keyboard 158, and the mouse 157 are interconnected via a bus such that data can be mutually communicated therebetween.

The ROM 152 stores a basic program related to the operation of the computer. The RAM 153 is a storage device that temporarily stores various data such as results of arithmetic processing by the CPU 151. The SSD 154 records the results of arithmetic processing by the CPU 151, various data obtained from the outside, and the like, and also records the program 161 for causing the CPU 151 to execute various processing. The program 161 is application software that the CPU 151 can execute.

The I/O 155 is an interface to an external device. In addition, the I/O 155 is connectable to a removable memory 162 such as a recording disk or a storage device, and the I/O 155 is capable of loading various data, programs, and the like recorded in the removable memory 162.

The information processing apparatus 100 includes the SSD 154 as a storage device, but the configuration is not limited to this. The storage device that the information processing apparatus 100 includes may be, for example, an HDD.

In addition, although the SSD 154 serves as a non-transitory computer-readable recording medium that can be read by the computer and the program 161 is stored in the SSD 154 in the present embodiment, the configuration is not limited to this. The program 161 may be recorded in any recording medium as long as the recording medium is a non-transitory computer-readable recording medium. As the recording medium for supplying the program 161 to a computer, for example, the removable memory 162, a flexible disk, a hard disk, an optical disk, a magneto-photo disk, a magnetic tape, a nonvolatile memory, or the like can be used.

In the present embodiment, the information processing apparatus 100 is used for a user, for example, an end user to perform programming for system control of the robot system 1.

FIG. 2 is a control block diagram of the robot system 1 according to the embodiment. The CPU 151 of the information processing apparatus 100 functions as the information processing portion 50 by executing the program 161. The information processing portion 50 includes conversion portions 102 and 104.

The PLC 110, the camera controller 121, the hand controller 122, the sensor controller 123, the robot controller 124, the image processing apparatus 115, and the AI apparatus 116 are each a processing portion that executes processing on the basis of a command of mutually different specifications.

For example, software 130 that executes a ladder program is installed in the PLC 110. The PLC 110 executes control processing of the entire system on the basis of a command COM0 generated in a dedicated programming language.

Software 131 dedicated to camera control is installed in the camera controller 121. The camera controller 121 executes control processing of the camera 111 on the basis of a command COM1 generated in a dedicated programming language. In addition, as an example of control processing of the camera 111, the control of the camera 111 may be executed by a simple command such as an I/O command in a dedicated programming language.

Software 132 dedicated to hand control is installed in the hand controller 122. The hand controller 122 executes control processing of the suction hand 112 on the basis of a command COM2 generated in a dedicated programming language.

Software 133 dedicated to sensor control is installed in the sensor controller 123. The sensor controller 123 executes control processing of the sensor device 113 on the basis of a command COM3 generated in a dedicated programming language.

Software 134 dedicated to robot control is installed in the robot controller 124. The robot controller 124 executes control processing of the robot 114 on the basis of a command COM4 generated in a dedicated programming language.

An image processing library 135 dedicated to image processing is installed in the image processing apparatus 115. The image processing apparatus 115 executes image processing on the basis of a command COM5 generated in a dedicated programming language. The image processing is, for example, binarizing processing or pattern matching processing.

An AI library 136 dedicated to AI is installed in the AI apparatus 116. The AI apparatus 116 executes AI processing on the basis of a command COM6 generated in a dedicated programming language. The AI processing is, for example, processing of outputting output data in response to input data by using a learned model.

The software 130 to 136 is each configured by, for example, a software development kit: SDK.

A module set 103 is stored in a storage device such as the SSD 154. The module set 103 includes a plurality of modules. The modules included in the module set 103 are data used for generating commands that the information processing portion 50 outputs to corresponding devices.

The module set 103 includes at least one PLC module 140 serving as an example of a module. In addition, the module set 103 includes at least one camera control module 141 serving as an example of a module. In addition, the module set 103 includes at least one hand control module 142 serving as an example of a module. In addition, the module set 103 includes at least one sensor control module 143 serving as an example of a module. In addition, the module set 103 includes at least one robot control module 144 serving as an example of a module. In addition, the module set 103 includes at least one image processing module 145 serving as an example of a module. In addition, the module set 103 includes at least one AI module 146 serving as an example of a module.

The conversion portion 102 passes information between modules. The conversion portion 104 has a function of converting a module into a command. For example, the conversion portion 104 converts the PLC module 140 into the command COM0. In addition, for example, the conversion portion 104 converts the camera control module 141 into the command COM 1. In addition, for example, the conversion portion 104 converts the hand control module 142 into the command COM 2. In addition, for example, the conversion portion 104 converts the sensor control module 143 into the command COM 3. In addition, for example, the conversion portion 104 converts the robot control module 144 into the command COM 4. In addition, for example, the conversion portion 104 converts the image processing module 145 into the command COM 5. In addition, for example, the conversion portion 104 converts the AI module 146 into the command COM 6.

The conversion portion 104 communicates data with the devices 110, 121, 122, 123, 124, 115, and 116 of FIG. 2 via a communication management portion 105 by methods of corresponding communication standards. The conversion portion 104 generates the commands COM0 to COM6 each in a format communicable with a corresponding device in accordance with a corresponding communication standard.

For example, the communication standard between the conversion portion 104 and the PLC 110 is TCP/IP. In addition, for example, the communication standard between the conversion portion 104 and the camera controller 121 is USB3. In addition, for example, the communication standard between the conversion portion 104 and the hand controller 122 is Ethernet. In addition, for example, the communication standard between the conversion portion 104 and the sensor controller 123 is CC-Link. In addition, for example, the communication standard between the conversion portion 104 and the robot controller 124 is TCP/IP.

To be noted, although examples of communication standards have been described, the communication standards are not limited to these. For example, the communication interface of the sensor controller 123 is a CC-Link interface, but may be an I/O interface or a different field bus.

In addition, the sensor controller 123 may be directly connected to the information processing apparatus 100, but may be, for example, connected to the information processing apparatus 100 via the PLC 110.

In addition, the modules included in the module set 103 are not limited to the examples described above. For example, the module set 103 may include a control module of another FA device as a module. In addition, for example, the module set 103 may include a module that performs four arithmetic operations, logical operation, and matrix operation. In addition, for example, the module set 103 may include a module that obtains environmental information of a personal computer: PC. In addition, for example, the module set 103 may include a module that stores various data such as image data as a log.

The control flow program 101 is a program for integrally control the devices of the robot system 1, and is created by an end user via a graphical user interface: GUI. The control flow program 101 is a program for causing the information processing portion 50 to load a module or a combination of two or more modules from the module set 103 and generate a corresponding command.

The modules included in the module set 103 are created in accordance with a predetermined template. The predetermined template is a template conforming to one or more common specifications. FIG. 3 is a schematic diagram for describing a module creation method according to the embodiment.

A template 200 is an example of the predetermined template. The template 200 includes a setting portion 201 in which parameters are set, and setting portions 202, 203, and 204 in which programs are set Parameters to be passed to a source program of the setting portion 202, 203, or 204 are set in the setting portion 201. A source program for designating what kind of processing is to be executed is set in the setting portion 202. A source program for designating what kind of a result is to be output when causing a target device to perform processing in accordance with a command from the setting portion 202 is set in the setting portion 203. A source program for designating what kind of image is to be displayed on the display 156 is set in the setting portion 204. As described above, the template 200 is divided into the setting portions 201 to 204 for different functions.

Source programs described in a predetermined programming language, for example, C # are set in the setting portions 202 to 204. The parameters set in the setting portion 201 are called by the source programs.

For example, an identifier "PARAM" is given to the setting portion 201. For example, an identifier "RUN" is given to the setting portion 202. For example, an identifier "RESULT" is given to the setting portion 203. For example, an identifier "DISPLAY" is given to the setting portion 204.

For example, the camera control module 141 will be described. A source program for causing the camera 111 to perform imaging is set in the setting portion 202 to which the identifier "RUN" is given. Parameters determining the imaging conditions such as exposure time and gain are set in the setting portion 201 to which the identifier "PARAM" is given. A source program for storing, in the SSD 154, a captured image that is a result (output) of the image pickup processing is set in the setting portion 203 to which the identifier "RESULT" is given. A source program for causing the display 156 to display the captured image is set in the setting portion 204 to which the identifier "DISPLAY" is given.

Here, the parameters in the setting portion 201 of each module are set by the designer or the end user. That is, the parameters can be also set by the end user. In contrast, the source programs in the setting portions 202 to 204 of each module are set by the designer. That is, the source programs in the setting portions 202 to 204 of each module are prepared in advance, and the end user does not need to set these source programs.

The software 131 to 136 includes various functions. Therefore, a plurality of modules having different functions and corresponding to one of the plurality of software 131 to 136 can be also created. For example, two image processing modules $\mathbf{145}_1$ and $\mathbf{145}_2$ having different functions and corresponding to the image processing library 135 can be also created.

Figure 4:
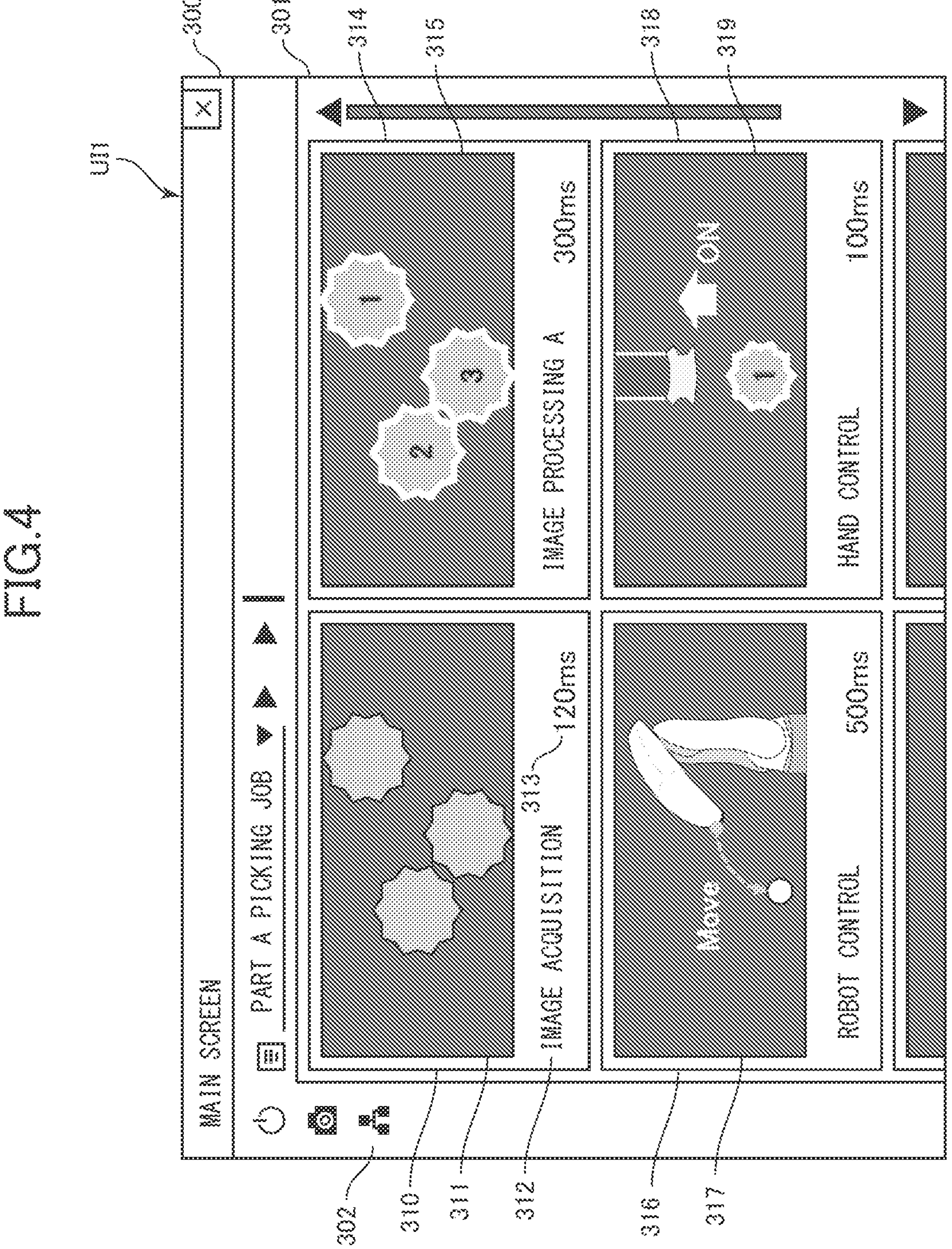
FIG. 4 is a schematic diagram illustrating an example of a user interface image according to the embodiment.

FIG. 4 is a schematic diagram illustrating an example of a user interface (UI) image UI1 according to the embodiment. FIG. 4 illustrates a main screen 300 in the user interface image UI1. To be noted, the user interface image UI1 is configured such that operation by the user on the user interface image UI1 is performed by using the keyboard 158, a pointing device such as the mouse 157, or the like.

The main screen 300 includes a list display portion 301 and a transition button 302. The information processing portion 50 displays, in the form of a list in the list display portion 301, information of the modules included in the control flow program 101 created by the user. To be noted, FIG. 4 illustrates a state after the control flow program 101 has been generated and control has been executed in accordance with the control flow program 101.

The list display portion 301 displays display windows of a number corresponding to the number of pieces of information of modules included in the control flow program 101. For example, in the example of FIG. 4, the control flow program 101 includes, as the information of the modules, information of the camera control module 141, information of the image processing module $\mathbf{145}_1$, information of the robot control module 144, and information of the hand control module 142. The list display portion 301 displays display windows 310, 314, 316, and 318 respectively corresponding to the modules 141, $\mathbf{145}_1$, 144, and 142.

For example, the display window 310 is a display window corresponding to the camera control module 141. The display window 310 includes a display region 311 for displaying an obtained image, a display region 312 for displaying the name given to the module, and a display region 313 for displaying processing time.

In addition, for example, the display window 314 is a display window corresponding to the image processing module $\mathbf{145}_1$. The display window 314 includes a display region 315 for displaying the outline of parts detected by image recognition, and the number of the detected parts.

In addition, for example, the display window 316 is a display window corresponding to the robot control module 144. The display window 316 includes a display region 317 for displaying coordinates of a destination of movement of the robot 114.

In addition, for example, the display window 318 is a display window corresponding to the hand control module 142. The display window 318 includes a display region 319 for displaying the positional relationship between the suction hand 112 and a detected part, and information indicating that the suction hand 112 is to be turned on.

Here, the modules included in the module set 103 are created in accordance with the template 200. As a result of this, in correspondence with the module, consistent information can be displayed in the plurality of display windows 310, 314, 316, and 318. For example, the module name can be displayed in the display region 312, and time required for processing of the module can be displayed in the display region 312. In addition, in the display region 311 and the display region 317, results of execution of the module expressed by images can be recognized.

Figure 5:
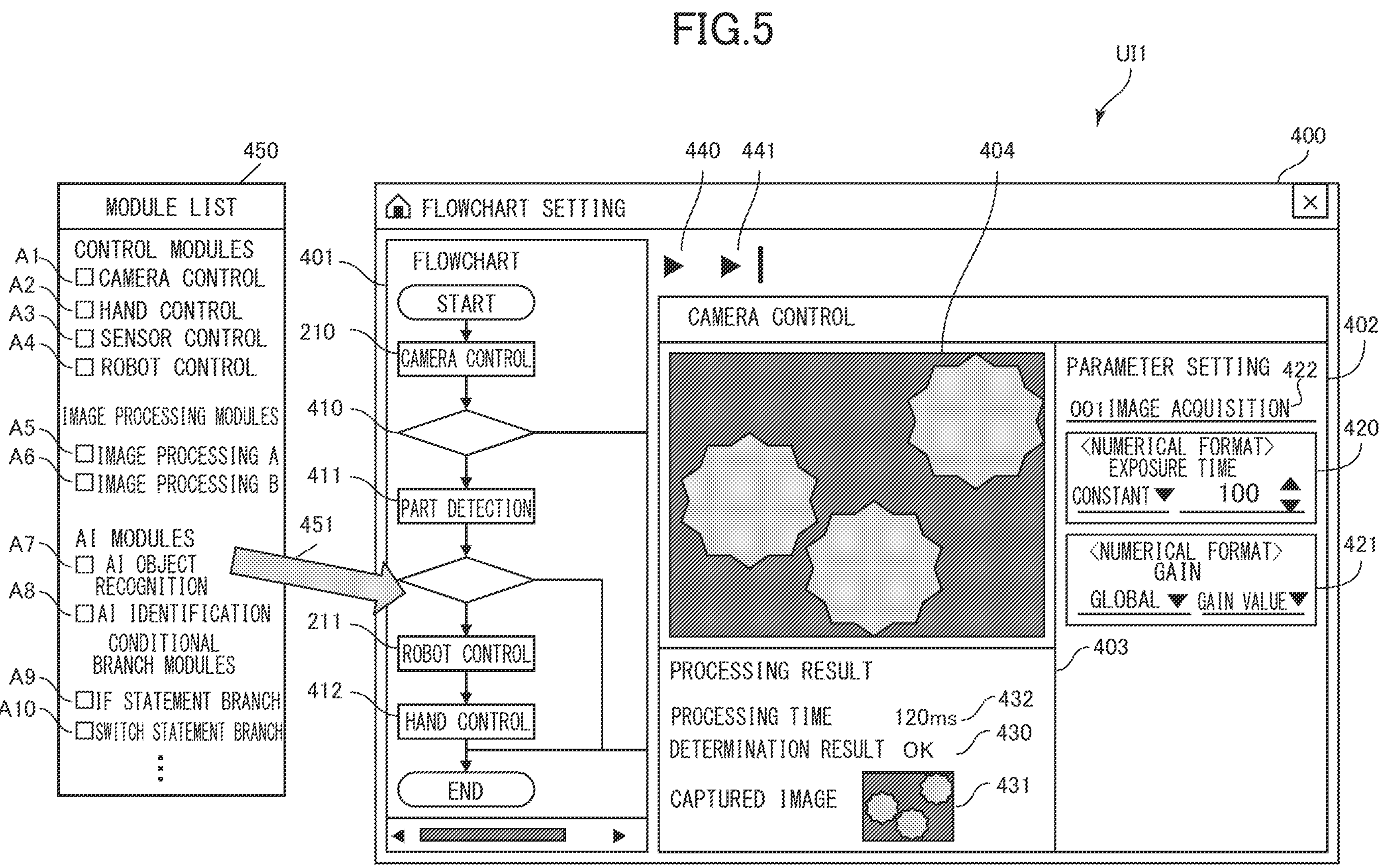
FIG. 5 is a schematic diagram illustrating an example of a user interface image according to the embodiment.

When the transition button 302 is operated, the information processing portion 50 causes the user interface image UI1 to transition from the main screen 300 to a setting screen 400 and a module list screen 450 illustrated in FIG. 5. FIG. 5 is a schematic diagram illustrating an example of the user interface image UI1 according to the embodiment. FIG. 5 illustrates the setting screen 400 and the module list screen 450 in the user interface image UI1.

The module list screen 450 is a region for displaying a plurality of image elements A1 to A10. The plurality of image elements A1 to A10 respectively correspond to the plurality of modules included in the module set 103. The module list screen 450 is an example of a first region.

The setting screen 400 includes a flowchart setting window 401, a parameter setting window 402, a processing result checking window 403, and an image checking window 404. In addition, the setting screen 400 includes operation buttons 440 and 441. When the operation button 440 is operated once, the information processing portion 50 executes, for one cycle in accordance with the flow, a plurality of modules designated in the control flow program 101. In addition, each time the operation button 441 is operated, the information processing portion 50 executes, one step at a time in accordance with the flow, the plurality of modules designated in the control flow program 101.

By operating the operation button 440, the user can check the operation of the robot system 1 throughout the entirety ofthe created control flow program 101. In addition, the user can check the progressing operation of the robot system 1 of the created control flow program 101 by operating the operation button 441.

The flowchart setting window 401 is a region for creating the control flow program 101. The flowchart setting window 401 is an example of a second region.

The information processing portion 50 receives selection of an image element from the plurality of image elements A1 to A10 respectively corresponding to the plurality of modules displayed in the module list screen 450. The information processing portion 50 receives selection of a module corresponding to an image element in response to the image element in the module list screen 450 being dragged to and dropped in the flowchart setting window 401 by an operation 451 by the user.

In addition, in the flowchart setting window 401, the information processing portion 50 receives connecting operation between image elements indicating modules, and receives selection of a conditional branch module corresponding to the image elements A9 and A10 in response to the drag-and-drop operation 451 of the image elements A9 and A10.

The information processing portion 50 receives these operations, and thus displays the dragged and dropped image elements in the flowchart setting window 401 in the form of a flowchart arranged in the order of control. The flowchart created in the flowchart setting window 401 is associated with the flow in the control flow program 101. Therefore, the user combines the image elements in the form of flowchart in the flowchart setting window 401, and thus can program the control flow program 101.

Here, for example, in the case where the image element A1 corresponding to the camera control module 141 is selected by clicking, the information processing portion 50 displays the information of the camera control module 141 in the parameter setting window 402, the processing result checking window 403, and the image checking window 404. As a result of this, the user can check the parameter settings, processing results, and a captured image of the camera control module 141.

The information processing portion 50 displays, in the parameter setting window 402, setting windows 420 and 421 for receiving settings of the parameters for the module selected by the user. The setting window 420 is, for example, a window for receiving setting ofthe exposure time. The setting window 421 is, for example, a window for receiving setting ofthe gain.

Setting windows of a number equal to the number of parameters set for the module are displayed. For the camera control module 141, the number of parameters to be set is 2, and the two setting windows 420 and 421 are displayed in the parameter setting window 402. According to such a configuration, the user can set the parameters corresponding to the selected module via the GUI.

In the present embodiment, the modules included in the module set 103 are created in accordance with the template 200. In the present embodiment, the information processing portion 50 displays, in the setting screen 400, a parameter setting window 402 for receiving parameters to beset in the setting portion 201 of the module. Therefore, no matter which module is selected, the information processing portion 50 can display, for example, the setting windows 420 and 421 with a sense of consistency in terms of appearance and operability. To be noted, the information processing portion 50 may display the name given to the module in a display region 422 of the parameter setting window 402.

In addition, when the operation button 440 or 441 is operated, the information processing portion 50 executes the source program set in the setting portion 202 of the module to execute predetermined processing, and executes the source program set in the setting portion 203 of the module to obtain a processing result. At this time, the information processing portion 50 displays the processing result in the processing result checking window 403.

For example, the information processing portion 50 displays a processing time having been required for the processing of the module in a region 432 included in the processing result checking window 403, and displays, in a region 430 included in the processing result checking window 403, adeterminationresultofwhetherornotthemodulehassuccessfullyoperated. The processing time and the determination result are common processing results that can be obtained for all the modules in the module set 103. That is, the information processing portion 50 displays processing results common to all the modules in the regions 432 and 430.

Meanwhile, the information processing portion 50 displays a processing result unique to the module in a region 431 included in the processing result checking window 403. For example, in the case where the module is the camera control module 141, the information processing portion 50 displays a thumbnail indicating a captured image serving as a processing result in the region 431. To be noted, the processing results displayed in the processing result checking window 403 include data other than numerical data and character data, such as image data.

Figure 6:
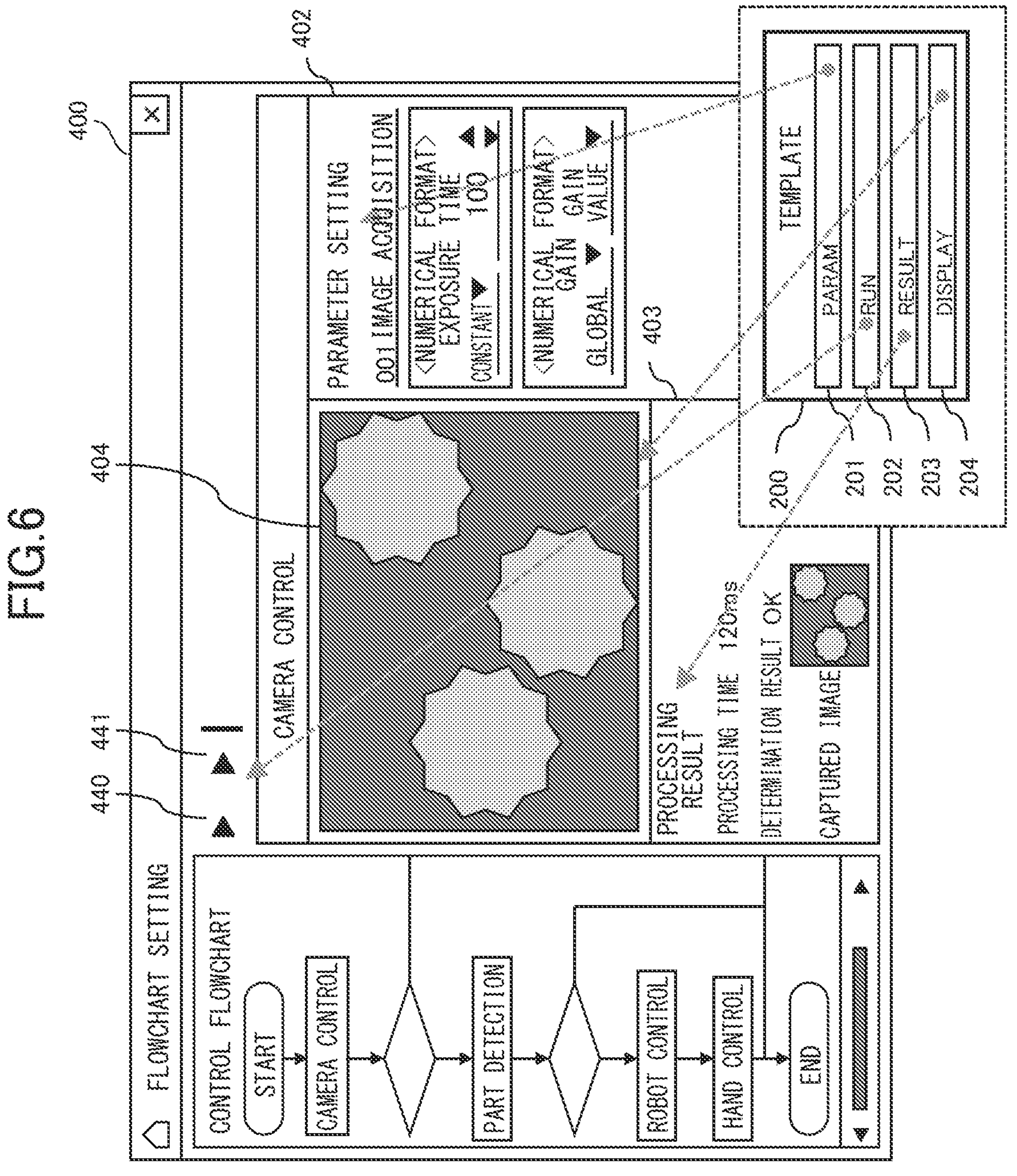
FIG. 6 is an explanatory diagram illustrating a correspondence relationship between a template and a setting screen according to the embodiment.

FIG. 6 is an explanatory diagram illustrating a correspondence relationship between the template 200 and the setting screen 400 according to the embodiment. The setting portion 201 to which the identifier"PARAM" is associated with the parameter setting window 402. The setting portion 202 to which the identifier "RUN" is given is associated with the operation buttons 440 and 441. The setting portion 203 to which the identifier "RESULT" is given is associated with the processing result checking window 403. The setting portion 204 to which the identifier "DISPLAY" is given is associated with the image checking window 404.

FIG. 7 is an explanatory diagram illustrating an example ofthe control flow program 101 according to the embodiment. FIG. 7 illustrates an example of the control flow program 101 that can be configured by the user. The created control flow program 101 is stored in, for example, the SSD 154. In addition, the SSD 154 stores global variables 600 that can be referred to in the control flow program 101.

The global variables 600 include, for example, numerical variables 500, determinant variables 510, string variables 520, selective variables 530, image variables 540, regional variables 550, POSE variables 560, and the like.

After starting control in accordance with the control flow program 101, first, the information processing portion 50 causes a robot control module 610 to operate. That is, the information processing portion 50 generates the command COM4 corresponding to the source program set in the setting portion 202 to which the identifier "RUN" is given and which is included in the robot control module 610. Then, the information processing portion 50 transmits the command COM4 to the robot controller 124 to cause the robot controller 124 to execute the command COM4. A command to move the robot 114 to a movement destination position is described in the source program set in the setting portion 202.

In the robot control module 610, a parameter 611 of the movement destination position and a parameter 612 of the movement mode are setin the setting portion 201 to which the identifier "PARAM" is given, and the information processing portion 50 refers to these parameters 611 and 612 when generating the command COM4 on the basis ofthe source program in the setting portion 202. The parameter 611 is associated with, for example, an origin position variable 561 in the POSE variables 560 of the global variables 600. That is, the robot controller 124 controls the robot 114 to move to the origin position.

To be noted, although a case where the parameters set in the setting portion 201 of the robot control module 610 are the two parameters 611 and 612 has been described as an example, a plurality of other parameters such as a parameter for determining the operation speed and a parameter for instructing route points can be set. That is, the parameters set in the robot control module 610 are merely examples, and are not limited to these. The same applies to the parameters set for the other modules 620, 630, 640, 650, and 660 that will be described below.

Next, the information processing portion 50 causes the camera control module 620 to operate. That is, the information processing portion 50 generates the command COM1 corresponding to the source program set in the setting portion 202 to which the identifier "RUN" is given and which is included in the camera control module 620. Then, the information processing portion 50 transmits the command COM1 to the camera controller 121 to cause the camera controller 121 to execute the command COM1. A command to cause the camera 111 to perform imaging is described in the source program set in the setting portion 202. A captured image is obtained as a processing result 622 of the image pickup processing by the camera 111.

In the camera control module 620, a parameter 621 of the exposure time is setin the setting portion 201 to which the identifier "PARAM" is given, and the information processing portion 50 refers to the parameter 621 when generating the command COM1 on the basis ofthe source program in the setting portion 202. The parameter 621 is associated with, for example, an exposure time variable 501 in the numerical variables 500 of the global variables 600. That is, the camera controller 121 controls the camera 111 to perform imaging by using the exposure time set in the exposure time variable 501. The captured image is passed to a captured image variable 541 in the image variables 540.

Next, the information processing portion 50 causes a part detection module 630 to operate. That is, the information processing portion 50 generates the command COM5 corresponding to the source program set in the setting portion 202 to which the identifier "RUN" is given and which is included in the part detection module 630. Then, the information processing portion 50 transmits the command COM5 to the image processing apparatus 115 to cause the image processing apparatus 115 to execute the command COM5. The command COM5 is, for example, a command for causing image processing for detecting (recognizing) the positions of parts in the captured image. Recognized positions of parts are obtained as a processing result 633 of this image processing in a POSE format.

In the part detection module 630, a parameter 631 indicating a captured image to be used for image processing, and a parameter 632 indicating a threshold value are set in the setting portion 201 to which the identifier "PARAM" is given, and the information processing portion 50 refers to these parameters 631 and 632 when generating the command COM5 on the basis ofthe source program in the setting portion 202. The parameter 631 is associated with, for example, the captured image variable 541 in the image variables 540 of the global variables 600. That is, the image processing apparatus 115 receives input of the captured image set in the captured image variable 541, and performs image processing on that captured image. To be noted, although a case where a captured image is registered in the captured image variable 541 has been described, the image processing apparatus 115 may directly receive input of a captured image from the camera controller 121.

In addition, the image processing apparatus 115 outputs a determination result based on the image processing as a processing result 634 in a determinant format. For example, the image processing apparatus 115 outputs the processing result 634 in a determinant format as a value indicating "TRUE" or a value indicating "FALSE". In the case where detection of the positions of the parts is successful, the value indicating "TRUE" is output, and in the case where thedetectionofthepositionsofthepartsisnotsuccessful, thevalueindicating "FALSE" is output.

Next, the information processing portion 50 causes a conditional branch module 640 to operate. That is, the information processing portion 50 generates a command corresponding to the source program set in the setting portion 202 to which the identifier "RUN" is given and which is included in the part detection module 630. As determination processing, in the case where the value of the parameter 641 indicates "TRUE", the information processing portion causes the process to progress to a robot control module 650 that moves the robot 114 to a part take-out position, and in the case where the value of the parameter 641 indicates "FALSE", the information processing portion 50 finishes the process.

In the conditional branch module 640, using the processing result 634 in a determinant format as the parameter 641 is set in the setting portion 201 to which the identifier "PARAM" is given.

In the case where the value of the parameter 641 indicates "TRUE", the information processing portion 50 causes the robot control module 650 to operate. That is, the information processing portion 50 generates the command COM4 corresponding to the source program set in the setting portion 202 to which the identifier "RUN" is given and which is included in the robot control module 650. Then, the information processing portion 50 transmits the command COM4 to the robot controller 124 to cause the robot controller 124 to execute the command COM4. A command to cause the robot 114 to move to the movement destination position is described in the source program set in the setting portion 202.

In the robot control module 650, a parameter 651 of the movement destination position is set in the setting portion 201 to which the identifier "PARAM" is given, and the information processing portion 50 refers to the parameter 651 when generating the command COM4 on the basis of the source program in the setting portion 202. For example, a recognized position serving as the processing result 633 is set in the parameter 651. That is, the robot controller 124 controls the robot 114 to move to the recognized position.

Next, the information processing portion 50 causes the robot control module 660 to operate. That is, the information processing portion 50 generates the command COM4 corresponding to the source program set in the setting portion 202 to which the identifier "RUN" is given and which is included in the robot control module 660. Then, the information processing portion 50 transmits the command COM4 to the robot controller 124 to cause the robot controller 124 to execute the command COM4. A command to cause the robot 114 to move to the movement destination position is described in the source program set in the setting portion 202.

In the robot control module 660, a parameter 661 of the movement destination position and a parameter 662 of the movement mode are setin the setting portion 201 to which the identifier "PARAM" is given, and the information processing portion 50 refers to these parameters 661 and 662 when generating the command COM4 on the basis of the source program in the setting portion 202. For example, the parameter 661 is associated with the origin position variable 561 in the POSE variables 560 ofthe global variables 600. That is, the robot controller 124 controls the robot 114 to move to the origin position.

As described above, the parameters set for the module may be obtained via the global variables 600, or may be obtained from processing results of the other modules. In the communication of parameters between modules, it is preferable that the parameters are in the same format as the processing result. For example, in the case where the parameters are in the POSE format, the processing result input of which as parameters is to be received is preferably in the POSE format.

The setting windows serving as UI for setting parameters, for example, the setting windows 420 and 421 illustrated in FIG. 5 are each prepared in accordance with the format of the parameters. Via the setting windows for parameter settings, the user can directly set constants, perform setting so as to receive data from processing results of other modules, or perform setting so as to receive data from the global variables 600.

FIGS. 8A to 9C are explanatory diagrams illustrating examples of setting windows for parameter setting according to the present embodiment. The parameters set in the setting portion 201 of a module included in the module set 103 can be input, for example, via one ofthe setting windows 700, 710, 720, 730, and 740 illustrated in FIGS. 8A to 9C. The setting windows 700, 710, 720, 730, and 740 are each displayed in the parameter setting window 402 by the information processing portion 50.

Figure 8A:
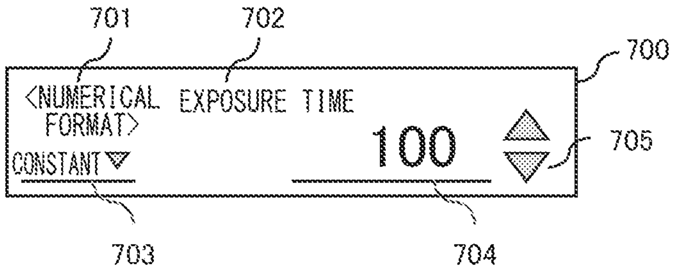
FIG. 8A is an explanatory diagram illustrating an example of a setting window for parameter settings according to the embodiment.
Figure 8B:
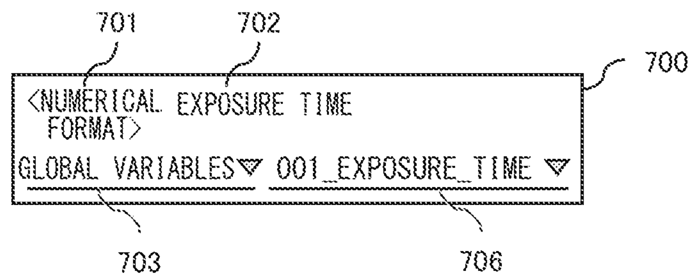
FIG. 8B is an explanatory diagram illustrating an example of a setting window for parameter settings according to the embodiment.

FIGS. 8A and 8B illustrate a setting window 700 for setting the exposure time. The format of the parameter is displayed in a UI 701 in the setting window 700. In the example of FIGS. 8A and 8B, characters "NUMERICAL FORMAT" is displayed. The name of the parameter is displayed in the UI 702 in the setting window 700. In the example of FIGS. 8A and 8B, characters "EXPOSURE TIME" is displayed. As a result of this, the user can see that the setting window 700 is a window for setting the exposure time in a numerical format as a parameter. The UIs 701 and 702 are display regions that common to all the parameters regardless of the format ofthe parameter.

A UI 703 in the setting window 700 is a UI for selecting a constant or a point to refer to. In the example of FIG. 8A, "CONSTANT" is selected. In the case where "CONSTANT" is selected in the UI 703, the information processing portion 50 displays a UI 704 for receiving input of the parameter (numerical value) of the exposure time, and a UI 705 for receiving input of increase and decrease of the numerical value. The information processing portion 50 receives, in the UI 705, selection of one parameter from a group of parameters constituted by a plurality of parameters serving as candidates. The user can set the parameter of the exposure time by increasing or decreasing the numerical value of the UI 704 by operating the UI 705 for increasing and decreasing the numerical value. In addition, a numerical value can be directly input to the UI 704. These UIs 704 and 705 facilitate setting a numerical parameter such as the exposure time.

In the example of FIG. 8B, "GLOBAL VARIABLES" is selected as a reference point. To be noted, the user can set a reference point different from "GLOBAL VARIABLES" by operating the UI 703. In the example of FIG. 8B, the global variables 600 of FIG. 7 are set to be referred to.

The setting method in the case of referring to data in the reference point is as illustrated in FIG. 8B. For example, when "GLOBAL VARIABLES" is selected, the information processing portion 50 displays a UI 706 for selecting variables to be referred to. To be noted, in the example of FIG. 8B, the reference point is "NUMERICAL FORMAT", and therefore the information processing portion 50 receives only selection of variables belonging to the numerical variables 500 in the global variables 600. The numerical variables 500 include a group of parameters constituted by a plurality of parameters serving as candidates. In the example of FIG. 8B, the exposure time variable 501 of FIG. 7 is selected from the group of parameters. The UI 706 configured in this manner facilitates setting of a numerical parameter such as the exposure time.

Figure 8C:
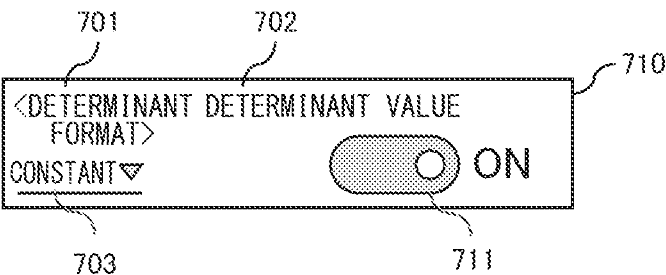
FIG. 8C is an explanatory diagram illustrating an example of a setting window for parameter settings according to the embodiment.

To be noted, also in the case where the user selects "CONSTANT" in the UI 703, how to instruct a parameter differs depending on the format of the parameter. FIG. 8C illustrates a setting window 710 for setting a determinant value. In FIG. 8C, a case where the format ofthe parameter is a determinant format is illustrated as an example. For example, in the case of a determinant parameter for instructing ON/OFF or TRUE/FALSE, the information processing portion 50 displays a UI 711 for setting a determinant value as illustrated in FIG. 8C.

Figure 8D:
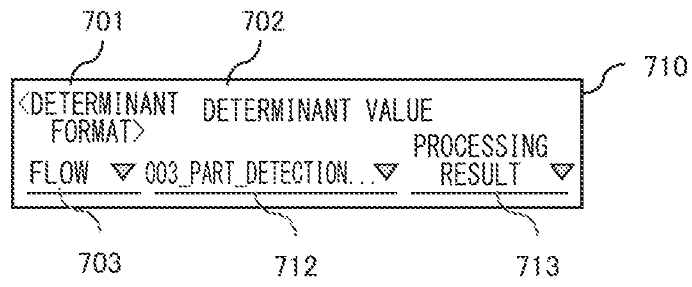
FIG. 8D is an explanatory diagram illustrating an example of a setting window for parameter settings according to the embodiment.

There is also a case of referring to a processing result of another module. FIG. 8D illustrates a setting window 710 for setting a determinant value. As illustrated in FIG. 8D, in the case where "FLOW" is selected as a reference point in the UI 703, the information processing portion 50 displays a UI 712 for receiving designation of a module to refer to. In the UI 712, the user designates a module.

To be noted, since a plurality of processing results can be output when a module is executed, the information processing portion 50 displays a UI 713 for receiving selection of which processing result is to be referred to. In the example of FIG. 8D, for example, a processing result 634 in a determinant format output from the part detection module 630 belonging to the control flow program 101 is referred to as a parameter. The processing result 634 in a determinant format is a determination result.

In addition, when a module is executed, although a plurality of processing results can be output, only a processing result in a determinant format is displayed in the UI 713. This also applies to other formats than the determinant format.

Figure 9A:
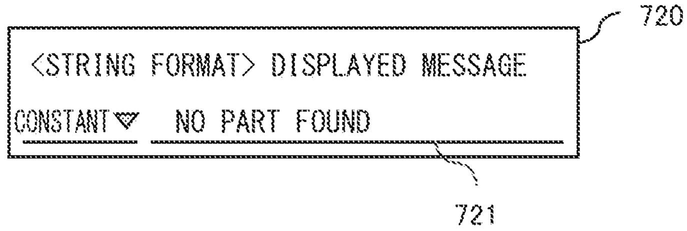
FIG. 9A is an explanatory diagram illustrating an example of a setting window for parameter settings according to the embodiment.

FIG. 9A illustrates an example of a setting window 720 for setting a parameter in a string format. In the case of a string parameter, the information processing portion 50 displays a UI 721 for inputting a string as illustrated in FIG. 9A. The user can set a string as a parameter by inputting a string in the UI 721.

Figure 9B:
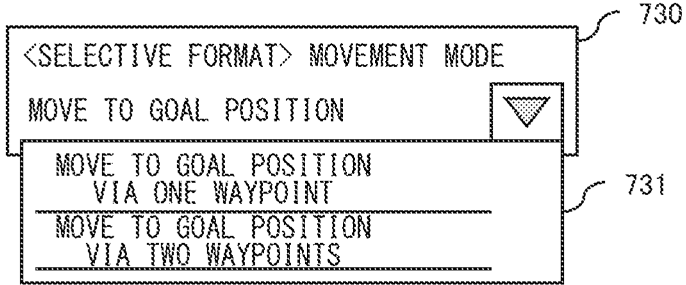
FIG. 9B is an explanatory diagram illustrating an example of a setting window for parameter settings according to the embodiment.

FIG. 9B illustrates an example of a setting window 730 for setting a parameter in a selective format. In the case of a selective parameter, the information processing portion 50 displays a UI 731 for receiving selection from options as illustrated in FIG. 9B. The user can set a parameter by selecting one of a plurality of options displayed in the UI 731.

Figure 9C:
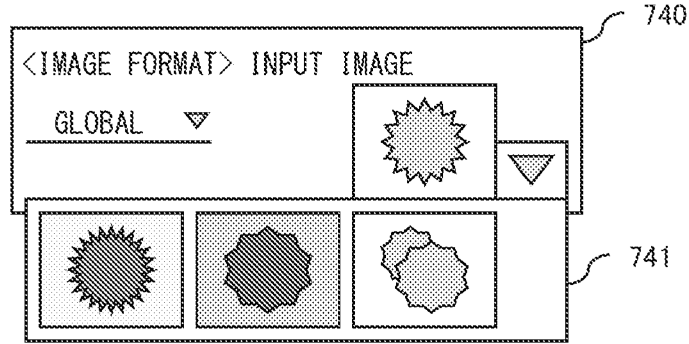
FIG. 9C is an explanatory diagram illustrating an example of a setting window for parameter settings according to the embodiment.

FIG. 9C illustrates an example of a setting window 740 for setting a parameter in an image format.

In the case of a parameter in an image format, the information processing portion 50 displays a UI 741 for receiving an image from the global variables 600 as illustrated in FIG. 9C. The user can designate an image to be set as a parameter from displayed images.

It is also possible to register a variable in the global variables 600. FIG. 10 is a schematic diagram illustrating an example of the user interface image UI1 according to the embodiment. FIG. 10 illustrates the setting screen 400 in the user interface image UI1. A method for storing data obtained as a processing result of a module in the global variables 600 will be described.

The information processing portion 50 displays, in the processing result checking window 403, a setting window 800 for receiving selection of a processing result to be stored in the global variables 600. The information processing portion 50 displays, in the setting window 800, a UI 801 for receiving selection of an output destination and a UI802 for receiving selection of a variable number, and receives designation of a place where data is to be stored via the Us 801 and 802. In the case of a processing result in an image format, the captured image is stored in, for example, the captured image variable 541 belonging to the image variables 540 in the global variables 600.

As described above, according to the present embodiment, the control flow program 101 capable of integrally controlling the FA devices can be created by a simple operation such as selecting each item displayed in the setting screen 400 even if the end user serving as a system developer is not an engineer.

Description will be given below assuming that, for example, the camera 111 serves as a first control target and the robot 114 serves as a second control target. The camera controller 121 is configured to execute processing on the basis of the command COM1. The robot controller 124 is configured to execute processing on the basis of the command COM4 conforming to different specifications than the command COM1. The camera controller 121 is, for example, an example of a first processing portion. The robot controller 124 is, for example, am example of a second processing portion. In addition, the command COM1 is an example of a first command. In addition, the command COM4 is an example of a second command.

The processing executed by the camera controller 121 is processing of controlling the camera 111 on the basis of the command COM1. The processing executed by the robot controller 124 is processing of controlling the robot 114 on the basis of the command COM4.

The information processing portion 50 displays, on the display 156, the user interface image UI1 that can receive selection of the camera control module 141 and the robot control module 144. The camera control module 141 is an example of a first module, and the robot control module 144 is an example of a second module. The information processing portion 50 obtains the command COM1 on the basis of the camera control module 141 when receiving the selection of the camera control module 141. In addition, the information processing portion 50 obtains the command COM4 on the basis of the robot control module 144 when receiving the selection of the robot control module 144.

According to the configuration described above, the user can perform programming by just selecting the camera control module 141 or the robot control module 144 in the user interface image UI1, and thus the convenience ofthe programming is improved.

Here, the command COM 1 is a command conforming to the specifications of the programming language of the software 131 dedicated to camera control. The command COM4 is a command conforming to a programming language of the software 134 dedicated to robot control that is different from the programming language of the software 131. The programming language used in the software 131 is an example of a first programming language. The programming language used in the software 134 is an example of a second programming language. The software 134 dedicated to robot control is, for example, a robot program. The user can easily perform programming without learning these programming languages, and thus the convenience ofthe programming is further improved.

The example described above is a case where there is a control target, but there is also a case where there is no control target, such as a case of the image processing apparatus 115 or the AI apparatus 116. Even in such a case, programming can be performed easily, and thus the convenience of the programming is improved.

As illustrated in FIG. 3, the camera control module 141 includes a source program PR1 described in a predetermined programming language, for example, C #. The source program PR1 is an example of a first source program. The source program PR1 includes program modules. The program modules of the source program PR1 are respectively set in the setting portions 202 to 204 of the camera control module 141. Similarly, the robot control module 144 includes a source program PR2 described in a predetermined programming language, for example, C #. The source program PR2 is an example of a second source program. The source program PR2 includes program modules. The program modules of the source program PR2 are respectively set in the setting portions 202 to 204 of the robot control module 144.

In the case of receiving selection of the camera control module 141, the information processing portion 50 converts the source program PR1 of the setting portion 202 from the predetermined programming language into the programming language of the software 131 dedicated to camera control, and outputs the converted source program PR1 to the camera controller 121 as the command COM1.

In addition, in the case of receiving selection of the robot control module 144, the information processing portion 50 converts the source program PR2 of the setting portion 202 from the predetermined programming language into the programming language of the software 134 dedicated to robot control, and outputs the converted source program PR2 to the robot controller 124 as the command COM4.

The source programs PR1 and PR2 are created in advance by a designer familiar with a predetermined programming language, for example, C #, and the user does notneed to create the source programs PR1 and PR2. As described above, the user can program the control flow program 101 by combining modules even if the user does not have knowledge for creating the source programs PR1 and PR2, and thus the convenience of programming is improved. In addition, by unifying the source programs PR1 and PR2 to the predetermined programming language, the work for the designer can be reduced. In the present embodiment, the source programs PR1 and PR2 are described in a programming language different from both the programming language of the software 131 and the programming language of the software 134, for example, C #.

To be noted, the source programs PR1 and PR2 may be in a text format or a binary format. In addition, the source programs PR1 and PR2 may be created in different programming languages. In this case, the source program PR1 is preferably described in the programming language of the software 131 dedicated to camera control, and the source program PR2 is preferably described in the programming language of the software 134 dedicated to robot control.

The camera control module 141 includes a parameter to be passed to the source program PR1, that is, to one of the setting portions 202 to 204. This parameter is set in the setting portion 201. As described above, by separating the parameter from the source program PR1, that is, the setting portions 202 to 204, the camera control module 141 can be more easily designed. The same applies to the other modules in the module set 103.

The information processing portion 50 enables receiving input of parameters in the parameter setting window 402 illustrated in FIG. 5. For example, input of respective parameters can be received in the setting window 420 for setting the exposure time and the setting window 421 for setting the gain. The parameters indicating the exposure time and the gain are examples of first parameters. As described above, the user can appropriately set the parameters, and thus the convenience ofthe programming is further improved.

In addition, as illustrated in FIG. 5, the user interface image UI1 includes the module list screen 450 and the flowchart setting window 401. The information processing portion 50 displays, in the module list screen 450, a list ofthe image elements A1 to A10 including the image element A1 corresponding to the camera control module 141 and the image element A4 corresponding to the robot control module 144. The image element A1 is an example of a first image element, and the image element A4 is an example of a second image element.

The information processing portion 50 receives selection of the camera control module 141 in response to the image element A1 being dragged to and dropped in the flowchart setting window 401. In addition, the information processing portion 50 receives selection of the robot control module 144 in response to the image element A4 being dragged to and dropped in the flowchart setting window 401. As a result of this, for example, in the case of operating the camera 111, the end user may drag and drop the image element A1 to and in the flowchart setting window 401 from the module list screen 450. In addition, for example, in the case of operating the robot 114, the end user may drag and drop the image element A4 to and in the flowchart setting window 401 from the module list screen 450.

As described above, the control flow program 101 can be created easily by combining a plurality of image elements. As a result of this, the convenience of integrally programming the operation of the entire robot system 1 is improved.

In addition, the information processing portion 50 displays, in the flowchart setting window 401, the dragged-and-dropped image elements arranged in the form of a flowchart in the order of control. As a result of this, the control flow is visualized, and the convenience of programming is further improved.

In addition, the information processing portion 50 displays the operation button 440 in the user interface image UI1 as illustrated in FIG. 5. The operation button 440 is a button for receiving a command to execute a plurality of modules in the order of control when selection of the plurality of modules is received, that is, when the plurality of image elements corresponding to the plurality of modules are arranged in the flowchart setting window 401. The operation button 440 is an example of a first button. The user operates the operation button 440, and thus control of one cycle according to the control flow program 101 is executed. As a result of this, the user can check the operation of one cycle from "START" to "END" of the control flow program 101.

In addition, the information processing portion 50 displays an operation button 441 in the user interface image UI1 as illustrated in FIG. 5. The operation button 441 is a button for receiving a command to execute one of a plurality of modules in the case of receiving the plurality of modules. The operation button 441 is an example of a second button. The user operates the operation button 441, and thus a module of one step in the control flow program 101 is executed. As a result of this, the user can check the operation of one step in the control flow program 101.

In this case, the information processing portion 50 displays an image indicating a processing result in the image checking window 404 as illustrated in FIG. 5. For example, in the case where a captured image is obtained as a processing result by execution of the camera control module 141, the information processing portion 50 displays the captured image obtained by imaging by the camera 111 in the image checking window 404. As a result of this, by displaying the processing result as an image in the image checking window 404, the user can check the processing result, that is, the captured image.

In addition, as illustrated in FIGS. 8A to 9C, the setting windows 700, 710, 720, 730, and 740 for setting parameters are prepared in correspondence with the data formats of the parameters as illustrated in FIGS. 8A to 9C. In each of the setting windows 700, 710, 720, 730, and 740, a parameter can be set by direct data input or selection operation. In the case of adding a data format, a setting window similar to the setting windows 700 to 740 may be prepared.

The user can start the processing of the control flow program 101 by operating the operation button 440 or 441 after creating the control flow program 101. For example, in the case of executing the robot control module 144 illustrated in FIG. 5, the information processing portion 50 loads the content of the setting portion 202 to which the identifier "RUN" is given and which is included in the robot control module 144, generates the command COM4 from the setting portion 202, and transmits the command COM4 to the robot controller 124. As a result of this, the robot controller 124 moves the robot 114 to an instructed position.

To be noted, the information processing portion 50 includes a conversion program corresponding to the software 130 to 136 in the conversion portion 104. Therefore, the source program of the setting portion 202 is converted into the command COM4 in accordance with the parameters set in the setting portion 201. Then, the command COM4 is passed to the robot controller 124 via the communication management portion 105. The robot controller 124 operates the robot 114 in accordance with the command COM4. To be noted, the target to which the command is transmitted is not limited to a controller, and may be a computer in which software such as an image processing library or an AI1 library is installed.

When the robot controller 124 operates the robot 114, the information processing portion 50 obtains the processing result thereof from the robot controller 124 via the communication management portion 105.

The information processing portion 50 executes the source program in the setting portion 203 of the robot control module 144 to which the identifier "RESULT" is given, and stores data indicating the processing result in the SSD 154. In addition, the information processing portion 50 executes the source program in the setting portion 204 of the robot control module 144 to which the identifier "DISPLAY" is given, and displays a display content corresponding to the processing result on the display 156 as a still image or a moving image.

In addition, the information processing portion 50 associates the functions of the setting portions 201 to 204 given to the template 200 with items displayed in the setting screen 400 as illustrated in FIG. 6. Therefore, the user can check the processing result of the operation based on the robot control module 144 via the processing result checking window 403 or the image checking window 404.

The display format of the user interface image UI1 is not limited to the format illustrated in FIG. 5, and may be, for example, a list displayed in the list display portion 301 as illustrated in FIG. 4.

In addition, since each module included in the module set 103 is created in accordance with the template 200, the information of each module can be displayed in an appearance with a sense of consistency.

In addition, it is also easy to add a module to the module set 103. Further, also for the conversion portion 104, it suffices if a conversion program for converting the added module to a programming language of corresponding software, which leads to excellent expandability.

Although a case of operating the robot 114 has been described above, a case of operating a plurality of FA devices in a cooperating manner will be described as an example. For example, part of an operation from the part detection module 630 to the robot control module 650 illustrated in FIG. 6 will be described.

In the flow of the control flow program 101, the position of a part is detected in the part detection module 630 on the basis of the captured image, and then the processing is branched in the conditional branch module 640 in accordance with a determination result of the part detection module 630. In the case where a part has been successfully detected in the part detection module 630, the control processing transitions to the robot control module 650, and in the case where the detection is not successful, the control processing transitions to "END".

To construct this flow, in FIG. 5, the end user spreads the image elements A5, A9, and A4 corresponding to the three modules described above in the flowchart setting window 401 by the operation 451 of dragging and dropping the image elements to and in the flowchart setting window 401 from the module list screen 450. Then, the user an operation to connect modules to make a flow chart in the flowchart setting window 401.

Next, to set the parameters of the three modules described above, the user clicks each of the image elements A5, A9, and A4 in the module list screen 450, thus displays the parameter setting window 402, and sets parameters in the setting portion 201 of the module corresponding to the clicked image element.

The user selects the part detection module 630 and selects the captured image serving as the processing result 622 of the camera control module 620 illustrated in FIG. 7 in the setting window 740 illustrated in FIG. 9C, and thus sets the captured image serving as the processing result 622 of the camera control module 620 as the parameter 631.

In addition, the part detection module 630 also includes a parameter 632 of a threshold value. The user sets a threshold value as the parameter 632 in the setting window 700 as illustrated in FIG. 8A.

Since a processing result 634 of the part detection module 630 in a determinant format is used as the parameter 641 of a determinant value of the conditional branch module 640, the user sets the parameter 641 by selecting from the setting window 710 illustrated in FIG. 8D. The transition destination can be branched in the conditional branch module 640 by this parameter 641.

Since the robot control module 650 uses a recognized position that is a processing result 633 of the part detection module 630 in a POSE format, the user sets the parameter via a setting window similarly to the other data formats.

As described above, also in the case of operating a plurality of FA devices in a cooperating manner, the user does not need to perform programming in programming languages of the respective FA devices, and can easily set the communication of data between modules by just an operation of inputting or selecting via a UI.

The created control flow program 101 is executed in response to the user operating the operation button 440 illustrated in FIG. 5. As a result of this, the communication of data between modules and transition of control are automatically performed, and thus the plurality of FA devices can be operated in a cooperating manner.

As described above, according to the present embodiment, the user does not need to perform programming in a programming language, and can easily create the control flow program 101 that integrally controls the entire robot system 1.

Therefore, the user can easily program the control flow program 101 even in the case where the user is not familiar with programming languages such as in the case where the user is not an engineer. Therefore, the programming efficiency is improved.

The present disclosure is not limited to the embodiment described above, and the embodiment can be modified in many ways within the technical concept of the present disclosure. In addition, the effects described in the present embodiment are merely enumeration of the most preferable effects that can be obtained from the embodiment of the present disclosure, and the effects of the embodiment of the present disclosure are not limited to the effects described in the present embodiment.

Although a case where one of the plurality of FA devices that the system includes is the robot 114 has been described as an example in the embodiment described above, the configuration is not limited to this, and the present disclosure is also applicable to a case where the robot 114 is not provided. In addition, the plurality of FA devices may include a device that is capable of receiving a communication command from the outside, such as a conveyor, a linear actuator, an air cylinder, or a device capable of three-dimensional distance measurement.

In addition, although a case where the first processing portion is the camera controller 121 and the second processing portion is the robot controller 124 has been described as an example in the embodiment described above, the configuration is not limited to this. The first processing portion can be any one of a plurality of devices such as the PLC 110, the camera controller 121, the hand controller 122, the sensor controller 123, the robot controller 124, the image processing apparatus 115, and the AI apparatus 116. The second processing portion can be a device other than the first processing portion among the plurality of devices.

In addition, although a case where the information processing apparatus 100, the image processing apparatus 115, and the AI apparatus 116 are each constituted by a different computer has been described in the embodiment described above, the configuration is not limited to this. The information processing apparatus 100, the image processing apparatus 115, and the AI apparatus 116 may be constituted by one or a plurality of computers.

In addition, although a case where a display portion such as the display 156 and an input portion such as the mouse 157 and the keyboard 158 are constituted separately has been described in the embodiment described above, the configuration is not limited to this, and for example, the input portion and the display portion may be integrally constituted as in the case of a touch panel display.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more ofthe above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-116822, filed Jul. 22, 2022, which is hereby incorporated by reference herein in its entirety.

What is claimed is:

1. A system comprising:

a first control target;

a second control target that is different from the first control target;

a first processing portion configured to control the first control target based on a first command;

a second processing portion configured to control the second control target based on a second command that is different from the first command; and an information processing portion configured to display a user interface image configured to receive selection of a first module corresponding to the first control target and a second module corresponding to the second control target, wherein the first module includes:

a first parameter setting portion in which a parameter for obtaining the first command is set;

a first execution portion for outputting the first command to a first processing portion and for causing the first processing portion to execute control of the first control target; and a first obtaining portion for obtaining a first execution result obtained when the control of the first control target is executed based on the first command, wherein the second module includes:

a second parameter setting portion in which a parameter for obtaining the second command is set;

a second execution portion for outputting the second command to a second processing portion and for causing the second processing portion to execute control of the second control target; and a second obtaining portion for obtaining a second execution result obtained when the control of the second control target is executed based on the second command, wherein the user interface image is configured to receive a selection of either the first module or the second module for execution from a user, and wherein the user interface image is configured to receive input of a parameter to be set in the first parameter setting portion or the second parameter setting portion from a user.

2. The system according to claim 1, wherein the first command is a command conforming to specifications of a first programming language, and wherein the second command is a command conforming to specifications of a second programming language different from the first programming language.

3. The system according to claim 1, wherein the first execution portion and the first obtaining portion are set by a first source program described in a predetermined programming language.

4. The system according to claim 3, wherein the second execution portion and the second obtaining portion are set by a second source program described in the predetermined programming language.

5. The system according to claim 3, wherein the first command is a command conforming to specifications of a first programming language, and wherein the predetermined programming language is a programming language different from the first programming language.

6. The system according to claim 1, wherein the information processing portion is configured to receive input of a parameter from among a group of parameters in the first parameter setting portion and the second parameter setting portion.

7. The system according to claim 1, wherein the user interface image includes a module list screen and a flowchart setting window, and wherein the information processing portion is configured to:

display a first image element corresponding to the first module and a second image element corresponding to the second module in the module list screen, receive the selection of the first module in response to the first image element being dragged to and dropped in the flowchart setting window, and receive the selection of the second module in response to the second image element being dragged to and dropped in the flowchart setting window.

8. The system according to claim 7, wherein the information processing portion is configured to display image elements having been dragged to and dropped in the flowchart setting window, such that the image elements are arranged in a flowchart form in an order of control.

9. The system according to claim 1, wherein in a case where selection of a plurality of modules has been received, the information processing portion is configured to display, in the user interface image, a first button for receiving a command to sequentially execute the plurality of modules in an order of control.

10. The system according to claim 1, wherein in a case where selection of a plurality of modules has been received, the information processing portion is configured to display, in the user interface image, a second button for receiving a command to execute one of the plurality of modules.

11. The system according to claim 1, wherein the first control target is an image pickup apparatus.

12. The system according to claim 1, wherein the second control target is a robot.

13. The system according to claim 11, wherein the information processing portion displays, in the user interface image, a captured image obtained by imaging by the image pickup apparatus.

14. The system according to claim 1, wherein the first module and the second module are generated in accordance with a predetermined template.

15. A product manufacturing method comprising manufacturing a product by using the system according to claim 1.

16. An information processing apparatus comprising an information processing portion configured to display a user interface image configured to receive selection of a first module and a second module, the first module corresponding to a first control target controlled by a first processing portion based on a first command, the second module corresponding to a second control target controlled by a second processing portion based on a second command, wherein the first module includes:

a first parameter setting portion in which a parameter for obtaining the first command is set;

a first execution portion for outputting the first command to a first processing portion and for causing the first processing portion to execute control of the first control target; and a first obtaining portion for obtaining a first execution result obtained when the control of the first control target is executed based on the first command, wherein the second module includes:

a second parameter setting portion in which a parameter for obtaining the second command is set;

a second execution portion for outputting the second command to a second processing portion and for causing the second processing portion to execute control of the second control target; and a second obtaining portion for obtaining a second execution result obtained when the control of the second control target is executed based on the second command, wherein the user interface image is configured to receive a selection of either the first module or the second module for execution from a user, and wherein the user interface image is configured to receive input of a parameter to be set in the first parameter setting portion or the second parameter setting portion from a user.

17. An information processing method comprising displaying a user interface image configured to receive selection of a first module and a second module, the first module corresponding to a first control target controlled by a first processing portion based on a first command, the second module corresponding to a second control target controlled by a second processing portion based on a second command, wherein the first module includes:

a first parameter setting portion in which a parameter for obtaining the first command is set;

a first execution portion for outputting the first command to a first processing portion and for causing the first processing portion to execute control of the first control target; and a first obtaining portion for obtaining a first execution result obtained when the control of the first control target is executed based on the first command, wherein the second module includes:

a second parameter setting portion in which a parameter for obtaining the second command is set;

a second execution portion for outputting the second command to a second processing portion and for causing the second processing portion to execute control of the second control target; and a second obtaining portion for obtaining a second execution result obtained when the control of the second control target is executed based on the second command, wherein, in the user interface image, a selection of either the first module or the second module for execution is received from a user, and wherein, in the user interface image, input of a parameter to be set in the first parameter setting portion or the second parameter setting portion is received from a user.

18. A non-transitory computer-readable recording medium storing a program for causing a computer to execute the information processing method according to claim 17.

19. The system according to claim 1, wherein the information processing portion is configured to display, in the user interface image, (i) a first parameter setting window through which a user inputs a parameter set in the first parameter setting portion and (ii) a second parameter setting window through which a user inputs a parameter set in the second parameter setting portion.

20. The system according to claim 19, wherein at least one of a constant, data from a global variable, or an output result from another module is settable in the first parameter setting window and the second parameter setting window.

21. The system according to claim 1, wherein the first module includes, as a common specification, a first display output portion configured to display, in the user interface image, content of the first execution result obtained by the first obtaining portion, and wherein the second module includes, as a common specification, a second display output portion configured to display, in the user interface image, content of the second execution result obtained by the second obtaining portion.

22. The system according to claim 21, wherein the information processing portion is configured to:

display, in the user interface image, a first processing result checking window for allowing a user to confirm the first execution result output by the first display output portion; and display, in the user interface image, a second processing result checking window for allowing the user to confirm the second execution result output by the second display output portion.

23. The system according to claim 22, wherein at least one of data indicating the first execution result, an execution time, or a determination result is displayed in the first processing result checking window, and wherein at least one of data indicating the second execution result, an execution time, or a determination result is displayed in the second processing result checking window.

24. The system according to claim 1, wherein the first module includes the first parameter setting portion, the first execution portion, and the first obtaining portion and the second module includes the second parameter setting portion, the second execution portion, and the second obtaining portion thereby making the first module and the second module a common specification.

* * * * *